(12) United States Patent
Wright

(10) Patent No.: US 9,393,969 B1
(45) Date of Patent: Jul. 19, 2016

(54) SYSTEM FOR CONTROL OF COMPRESSORS AND AIR DRYERS IN TUNNELS

(71) Applicant: NEW YORK AIR BRAKE, LLC, Watertown, NY (US)

(72) Inventor: Eric C. Wright, Evans Mills, NY (US)

(73) Assignee: New York Air Brake, LLC, Watertown, NY (US)

( * ) Notice: Subject to any disclaimer, the term of this patent is extended or adjusted under 35 U.S.C. 154(b) by 0 days.

(21) Appl. No.: 14/598,318

(22) Filed: Jan. 16, 2015

(51) Int. Cl.
*G05D 1/00* (2006.01)
*B61D 27/00* (2006.01)
*B61L 3/22* (2006.01)
*B61C 5/02* (2006.01)
*F01P 1/00* (2006.01)
*F01P 7/02* (2006.01)

(52) U.S. Cl.
CPC ... *B61C 5/02* (2013.01); *F01P 1/00* (2013.01); *F01P 7/02* (2013.01)

(58) Field of Classification Search
USPC .......................... 701/19; 454/75; 246/167 R
See application file for complete search history.

(56) References Cited

U.S. PATENT DOCUMENTS

| | | | |
|---|---|---|---|
| 4,698,761 A * | 10/1987 | Cooper | G05D 23/24 123/198 D |
| 5,137,490 A * | 8/1992 | Ishikawa | B61D 27/00 454/105 |
| 5,950,967 A | 9/1999 | Montgomery | |
| 8,924,052 B2 * | 12/2014 | Melas | B16C 17/12 104/88.02 |
| 2002/0072833 A1 | 6/2002 | Gray | |
| 2003/0034423 A1 | 2/2003 | Hess et al. | |
| 2005/0109882 A1 * | 5/2005 | Armbruster | B61L 3/006 246/167 R |
| 2005/0120904 A1 | 6/2005 | Kumar et al. | |
| 2007/0219680 A1 | 9/2007 | Kumar et al. | |
| 2010/0235022 A1 | 9/2010 | Siddappa et al. | |
| 2010/0241295 A1 | 9/2010 | Cooper et al. | |
| 2012/0022728 A1 * | 1/2012 | Hall | B60L 11/123 701/19 |
| 2013/0046424 A1 * | 2/2013 | Gallagher | B61C 17/00 701/19 |

FOREIGN PATENT DOCUMENTS

| | | |
|---|---|---|
| DE | 10054152 | 3/2002 |
| WO | 2007095401 | 8/2007 |

OTHER PUBLICATIONS

International Search Report Form PCT/ISA/220, International Application No. PCT/US2015/011684, pp. 1-11, Dated Sep. 23, 2015.

* cited by examiner

*Primary Examiner* — Thomas G Black
*Assistant Examiner* — Tyler Paige
(74) *Attorney, Agent, or Firm* — Bond Schoeneck and King PLLC; David Nocilly

(57) ABSTRACT

An improved air supply control system for a locomotive that includes a global positioning system (GPS) and a track database having the locations of rail road tunnels. Locomotives equipped with one or more air compressors and/or an air dryer are operated by the air supply control system to, firstly, minimize unnecessary air compressor operation in a tunnel and, secondly, to operate only the compressor and air dryer of the lead locomotive in a consist if the air supply system must be operated while the locomotives are in a tunnel.

14 Claims, 4 Drawing Sheets

SYSTEM FOR CONTROL OF COMPRESSORS AND AIR DRYERS IN TUNNELS

BACKGROUND OF THE INVENTION

1. Field of the Invention

The present invention relates to locomotive air supply systems and, more particularly, to an air supply control system for optimizing operation of the air supply system when a locomotive is about to enter into a tunnel.

2. Description of the Related Art

Heavy haul freight trains such as those operated in North America typically have four to seven 4500 horse power diesel locomotives in a consist at the head end of the train to provide the required tractive effort. The first locomotive in the consist is typically called the lead locomotive and the remaining locomotives in the consist are generally referred to as the trailing locomotives. The tractive effort (propulsion) and brakes on the trailing locomotives are controlled by the driver in the lead locomotive.

When the locomotive consist travels through a tunnel, the multiple high-horse power locomotives can produce ambient temperatures in the tunnel as high as 140° C. (284° F.) at the location of the trailing locomotives. This very high ambient temperature is the result of both the accumulated waste heat from the locomotives and inefficient combustion at the trailing locomotives due to the oxygen depletion that results from the operation of the lead locomotive.

Traditionally, the air compressors on the locomotives are operated based on local pressure governor controls. The air compressors are turned on when the pressure in the first main reservoir drops to about 120 psi and turned off when the pressure in first main reservoir increases to 140 psi. Desiccant-type air dryers used to dry the compressed air produced by the air compressors regenerate the material in the desiccant bed by purging the desiccant bed with dry air from the main reservoir system on an independent cycle as determined by the air dryer or on an independent cycle determined by the air dryer only when the compressor is operating.

A typical two-stage locomotive compressor generally includes a first pressurization stage, an intercooler, a second pressurization stage, and an aftercooler. The internal air temperature in the second stage may be as high as 300° F. above ambient temperature due to the heat of compression. This air is cooled to 20° F. to 40° F. above ambient by the aftercooler before it is supplied to the main reservoir system.

In a tunnel, where the ambient temperature can reach 140° C. (284° F.) at the trailing locomotives, the internal temperature in the second stage of the air compressor can reach up to 600° F. due to the high initial ambient temperature and the heat of compression. Operating temperatures in this range can result in high rates of wear and degradation of the air compressor. Furthermore, the outlet temperature of 324° F. resulting from the high ambient temperature plus the 20 to 40° F. cooling delta of the aftercooler can degrade the air dryer as its treats the overly hot air discharged from the compressor. Thus, there is a need in the art to protect the air supply system from the overly hot air in a tunnel.

BRIEF SUMMARY OF THE INVENTION

The present invention comprises a system for controlling an air supply system of a train. The system includes a locomotive control system programmed to determine the location of a locomotive consist having a first locomotive and at least one trailing locomotive, where each locomotive in the consist has an air compressor and a main reservoir system. The air supply system may comprise an air dryer that is additionally controlled for tunnel operation. An air supply controller is interconnected to the air compressor and, optionally, the air dryer of each locomotive in the consist and programmed to command each air dryer to perform a regeneration cycle if the locomotive consist is approaching a tunnel. The air supply controller also commands each compressor to operate until a predetermined pressure in the air supply system is achieved if the locomotive consist is approaching a tunnel. In one embodiment, the air supply controller is also programmed to allow the compressor of the first locomotive to operate and to inhibit the compressors of all trailing locomotives from operating while the locomotive consist is in a tunnel. The air supply controller is further programmed to sequentially operate the compressor of each trailing locomotive if the air supply system has a pressure below a predetermined threshold while the locomotive consist is in a tunnel. In another embodiment, the air supply controller is programmed to reset the first compressor to operate when the air supply system has a pressure below a predetermined threshold that is above a pressure that will cause the compressor of each trailing locomotive to operate while the locomotive consist is in a tunnel. The air supply controller is further programmed to allow the compressor of each trailing locomotive to operate if air supply system has a pressure that is below the pressure that will cause the compressor of each trailing locomotive to operate while the locomotive consist is in a tunnel. In either embodiment, the air supply controller is further programmed to reset the compressors in the consist for normal operation after the locomotive consist has exited a tunnel.

In use, the control system involves determining the location of a locomotive consist having a first locomotive and at least one trailing locomotive, where each locomotive in the consist has an air compressor and a main reservoir system with an optional air dryer, and then conditioning the air dryer, if the locomotive is so equipped, for an upcoming tunnel by one of several means based on the air compressor and air dryer configuration. For example, in some locomotive configurations having an independently controllable air dryer, the control system may command each air dryer to perform a regeneration cycle if the locomotive consist is approaching a tunnel to minimize the likelihood of the air dryer on a trailing locomotive to regenerate while in the tunnel. If the regeneration of the air dryers is interlocked with the compressor "on" signal, however, compressor operation may be inhibited on trailing locomotives to prohibit regeneration of the trailing air dryers while in a tunnel. Lastly, the control system may simply suppress the regeneration of air dryers on the trailing locomotives during tunnel operation. Each compressor is then commanded to operate until a predetermined pressure in the air supply system is achieved if the locomotive consist is approaching a tunnel. In one embodiment, the compressor of the first locomotive is operated and the compressors of all trailing locomotives are inhibited from operating while the locomotive consist is in a tunnel. If the air supply system has a pressure below a predetermined threshold while the locomotive consist is in a tunnel, the compressor of each trailing locomotive is sequentially operated. In another embodiment, the first compressor is reset to operate when the air supply system has a pressure below a predetermined threshold that is above a pressure that will cause the compressor of each trailing locomotive to operate while the locomotive consist is in a tunnel. The compressor of each trailing locomotive is then operated normally if air supply system has a pressure that is below the pressure that will cause the compressor of each trailing locomotive to operate while the locomotive consist is in a tunnel. In either embodiment, the default operational state of the air supply system is restored after the locomotive consist has exited a tunnel.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
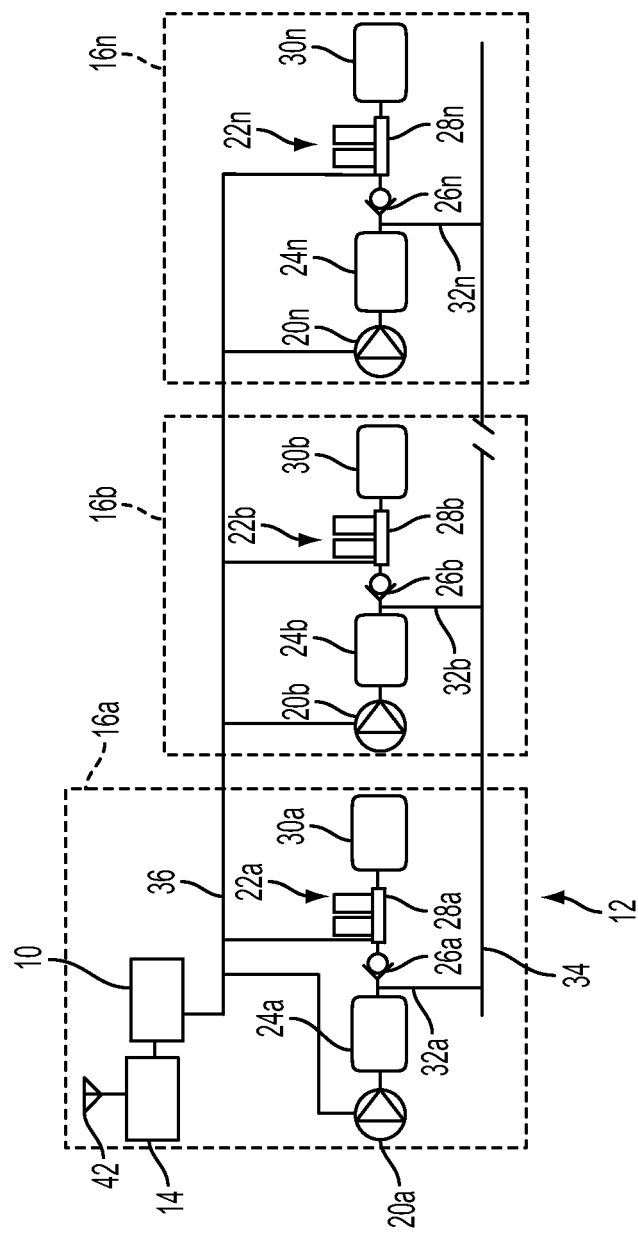
FIG. 1 is a schematic of an air supply system with an air supply controller according to the present invention.

Referring now to the drawings, wherein like reference numerals refer to like parts throughout, there is seen in FIG. 1 an air supply controller 10 for optimizing operation of the air supply system 12 as a train approaches and passes through a tunnel. Air supply system 12 provides the compressed air for operating the braking system of the train. Air supply controller 10 is interconnected to a locomotive control system 14 as well as the air supply system 12 formed by the locomotives 16 in a consist, depicted in FIG. 1 as a lead locomotive 16a along with trailing locomotives 16b through 16n. Each locomotive 16 in the consist is interconnected to air supply system 12 and includes at least one air compressor 20 that provides compressed air to a main reservoir system 22 having a first main reservoir 24, a check valve 26, an optional air dryer 28, and a second main reservoir 30. Main reservoir system 22 of each locomotive is interconnected by a pipe 32 to a main reservoir line 34 that interconnects the main reservoir system 22 of all locomotives 16a through 16n in a consist so that any locomotive 16 in a consist can recharge the main reservoir system 22 of other locomotives 16 and maintain the appropriate amount of pressure in air supply system 12 so that the braking system remains operational.

Controller 10 is preferably interconnected to air supply system 12 of each locomotive 16 by using individually addressable air compressors 20 and, optionally, air dryers 28 that can be electronically signaled and thus individually controlled by controller 10. For example, controller 10 may be interconnected to each air compressors 20 and air dryers 28 via a wired network 36 or a wireless network, such as IEEE 802.11. For a wired network 36, a spare wire in the existing 27 pin train lines used for intra-train communications may be used, such as by including a carrier network signal overlaid on the existing 27 pin train line compressor control wire, which is typically wire number 22. Compressors 20 normally will be put into an "on" state when the pressure in main reservoir system 22 falls below a certain lower threshold, such as 120 psi, and turned "off" when pressure in main reservoir system 22 a certain upper threshold, such as 140 psi. Controller 10 is configured to change this default or normal operation of compressors 20 as explained in more detail below.

Figure 2:
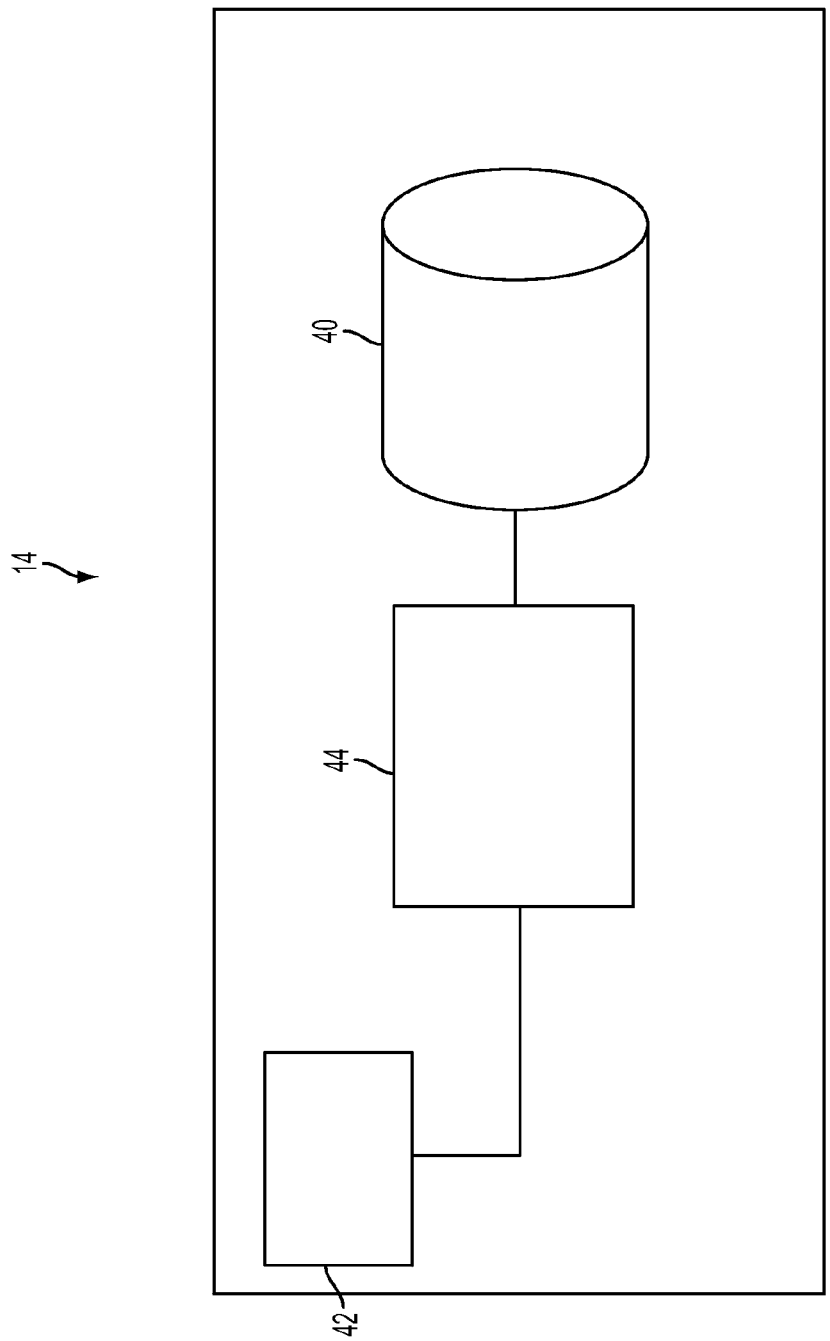
FIG. 2 is a schematic of a locomotive control system used with air supply controller according to the present invention.

Locomotive control system 14, such as the LEADER® system available from New York Air Brake of Watertown, N.Y., is installed in or operated from lead locomotive 16a. Locomotive control system 14 may be present in more than one locomotive 16, but typical practice to have locomotive control system 14 of lead locomotive 16a in control of the rest of the train. Referring to FIG. 2, locomotive control system 14 includes a track database 40 having geographic location data for track features and, more specifically, the location of each tunnel along a particular route. Locomotive control system 14 further includes a global positioning system (GPS) 42 and a processor 44 for determining the current location of lead locomotive 16a in the track database 40. Locomotive control system 14 can thus determine when the train is about to enter or has exited a tunnel in track database 40 by comparing the GPS location of the train to the location data in track database 40. As an alternative or supplement to GPS location services, locomotive control system 14 can receive and identify signals sent by wayside signaling devices that are placed along a route and used to, among other things, notify a passing locomotive control system 14 when the train is approaching or exiting a tunnel. It should be recognized by those of skill in the art that controller 10 may be implemented in a device that is separate from locomotive control system 14, or may be incorporated into locomotive control system 14 as an additional module, provided that the appropriate control can be maintained over compressors 20 and air dryers 28 as explained below.

Air supply controller 10 is programmed to control compressor 20 and air dryer 28 on lead locomotive 16a as well as on each of the trailing locomotives 16b through 16n in a consist to minimize operation of compressors 20 and air dryers 28 in the high ambient temperatures in a tunnel. Controller 10 minimizes unnecessary air regeneration in a tunnel by pre-charging the air supply system 12 prior to entering the tunnel, and then preferentially only allowing compressor 20 and air dryer 28 of lead locomotive 16a to operate while in the tunnel as the ambient air temperature at lead locomotive is much lower than the ambient temperatures at trailing locomotives 16b through 16n.

Figure 3:
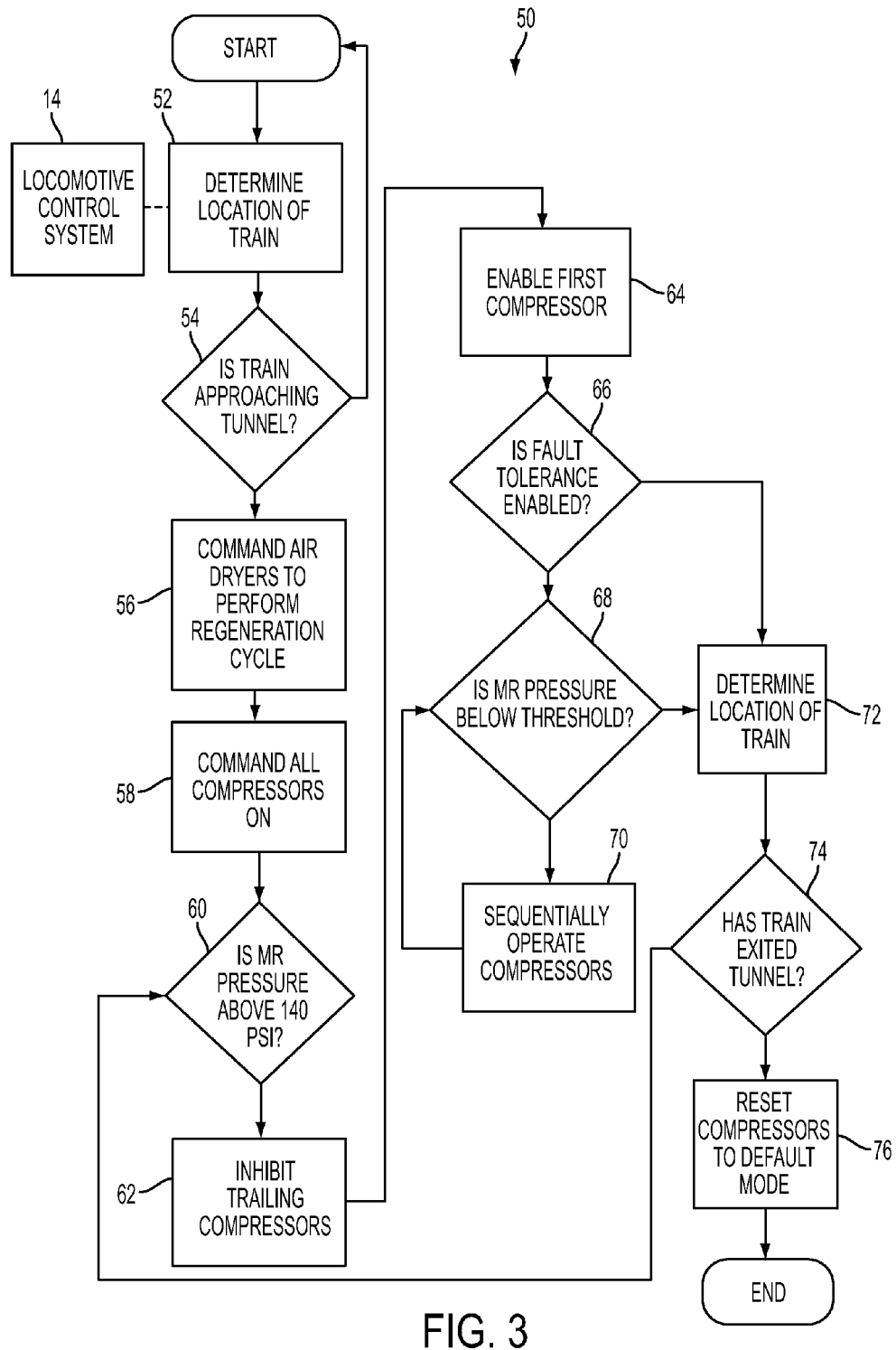
FIG. 3 is a flowchart of one embodiment of an air supply control process according to the present invention.

More particularly, as seen in FIG. 3, air supply controller 10 may be programmed to implement a control process 50 that begins with a determination of the location of a train 52. As explained above, controller 10 may determine the location of the train by communicating with locomotive control system 14 to glean the location of the train on the track database relative to a tunnel or to determine whether a wayside track signal indicating an upcoming tunnel has been received and processed. If a check determines that the train is approaching a tunnel 54, controller 10 commands all air dryers 28 to complete a regeneration cycle 56 so that the desiccant bed of each air dryer 28 is fully regenerated prior to entering the tunnel and preferentially avoiding the need for a regeneration cycle to be performed until all locomotives 16 exits the tunnel. As a regeneration cycle uses approximately fifteen to twenty percent of dry product air, performing the regeneration cycle in advance minimizes air consumption in the tunnel. This step 56 may be omitted if the consist does not include air dryer 28. Once the regeneration cycle is complete, controller 10 commands the compressors to turn "on" 58 even if the main reservoir pressure is greater than 120 psi to charge air supply system 22 to about 140 psi prior to entering the tunnel. Once a check 60 determines that air supply system 22 has achieved 140 psi, controller 10 inhibits the operation of compressors 20 of trailing locomotives 16b through 16n while the train is in the tunnel. As air dryer 28 typically monitors the on/off state of its associated compressor 20 and only initiates a regeneration cycle when compressor 20 is in an "on" state, the regeneration cycle of air dryers 28 of locomotives 16b through 16n will also be inhibited. Controller 10 next enables compressor 20 of lead locomotive 16a to operate in a normal fashion 64, thereby maintaining the pressure in main reservoir system 22 between the typical limits, e.g., between 120 psi and 140 psi. Controller 10 may also be configured to provide a fault tolerance by monitoring the pressure in main reservoir system 22. If a check 66 determines that fault tolerance is enabled, a check 68 is performed to determine whether the air pressure in main reservoir system 22 has dropped below a minimum threshold, such as 118 psi. If so, controller 10 sequentially enables compressors 20 of trailing locomotives 16b through 16n to operate 70 until the pressure in main reservoir system 22 is restored to within an acceptable tolerance. For example, if compressor 20 of lead locomotive 16a is unable to maintain the pressure in main reservoir system 22 within minimum tolerance, then compressor of second locomotive 16b is operated to pressurize main reservoir system 22. If two compressors are unable to maintain adequate pressure in main reservoir system 22, controller 10 can then operate compressor of locomotive 16n, etc., thereby sequentially adding air supply restoration capacity from the front of the locomotive consist toward the end of the consist until the demand is satisfied. Controller 10 can determine whether pressurization is sufficient using on-board diagnostics, such as those available from locomotive control system 14, or through dedicated sensors. If fault tolerance was not enabled, or if fault tolerance was enabled and main reservoir system 22 pressure has been restored, controller 10 again determines the location of the train 72 and checks 74 whether the train has exited the tunnel. If so, all compressors and air dryers in the consist are reset to operate in their default or normal mode 76, and process 50 concludes until controller 10 determines that the next tunnel is approaching.

Figure 4:
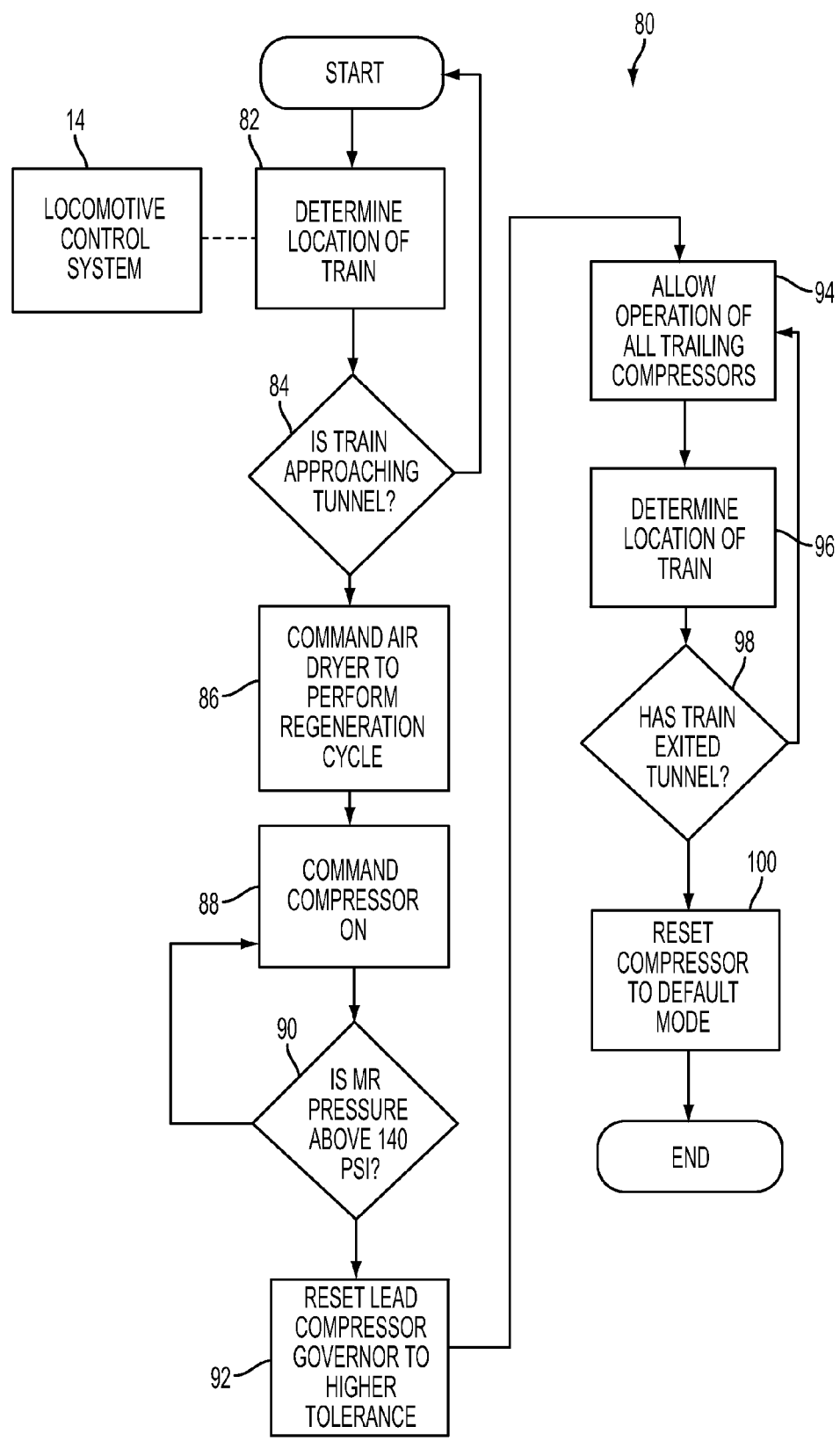
FIG. 4 is a flowchart of another embodiment of an air supply control process according to the present invention.

In another embodiment of the invention, controller 10 can implement a control process that only requires connection to compressor 20 and air dryer 28 (if applicable) of lead locomotive 16a. As with the embodiment of FIG. 1, controller 10 is interconnected to locomotive control system 14 to determine when the consist is approaching a tunnel. When a tunnel is imminent, controller 10 resets compressor 20 so that the "on" lower pressure governor setting of lead locomotive is slightly above the upper "on" tolerance for the remaining locomotives. For example, lead locomotive 16a can be reset to 125 psi and will thus turn on if the pressure drops below 125 psi, while the other compressors in the consist will not turn on until the main reservoir pressure drops to below 120 psi. Provided that compressor 20 of lead locomotive 16a is operational and has sufficient capacity to satisfy demand, pressure in main reservoir system 22 will not drop below 125 psi and thus compressors 20 of the trailing locomotives 16b through 16n will not operate. More specifically, as seen in FIG. 4, air supply control controller 10 may be programmed to implement a control process 80 that begins with a determination of the location of a train 82. As explained above, controller 10 may determine the location of the train by communicating with locomotive control system 14 to glean the location of the train on the track database relative to a tunnel or to determine whether a wayside track signal indicating an upcoming tunnel has been received and processed. If a check determines that the train is approaching a tunnel 84, controller 10 commands air dryer 28 on the lead locomotive to complete a regeneration cycle 86 so that the desiccant bed of air dryer 28 is fully regenerated prior to entering the tunnel and preferentially avoiding the need for a regeneration cycle to be performed until locomotive 16 exits the tunnel. As a regeneration cycle uses approximately fifteen to twenty percent of dry product air, performing the regeneration cycle in advance minimizes air consumption in the tunnel. This step may be omitted if lead locomotive does not have an air dryer 28. Once the regeneration cycle is complete, controller 10 commands compressor 20 to turn "on" 88 even if the main reservoir pressure is greater than 120 psi to charge air supply system 22 to about 140 psi prior to entering the tunnel. Once a check 90 determines that air supply system 22 has achieved 140 psi, the lower governor "on" setting for compressor 20 of lead locomotive 16a is then reset 92 to a higher threshold pressure for turning "on," such as 125 psi, to maintain the pressure in the main reservoir system between the limits of 120 psi and 140 psi throughout the time the train is in the tunnel. Provided compressor 20 of lead locomotive 16a is operational and has capacity to satisfy demand, the pressure in main reservoir system 22 should not drop below 125 psi and compressors of trailing compressors 16b through 16n will not need to operate. To provide a fault tolerance, compressors 20 of all other locomotives 16b through 16n operate normally so that if lead locomotive 16a is unable to maintain the pressure in main reservoir system 22 above the standard lower threshold of 120 psi, compressors 20 of locomotives 16b through 16n in the consist will operate in the usual way and turn "on" when main reservoir system 22 pressure drops below 120 psi. Finally, controller 10 determines the location of the train 96 and if a check 98 determines that the locomotive consist has exited the tunnel, such as by communicating with locomotive control system 14 that uses GPS and or track wayside signals, compressor 20 is restored to its default or normal operational mode 100 and process 80 concludes until the train approaches the next tunnel.

Thus, in any embodiment of the invention, air supply controller 10 changes the default operation of at least one compressor 20 and its associated air dryer 28 to minimize the amount of time the compressors 20 and associated air dryers 28 of trailing locomotives 16b through 16n will be operated while the train in a tunnel. When the locomotive consist exits a tunnel, the conventional operation of compressors 20 and air dryers 28 can be restored so that air supply system 12 functional in the default or normal mode.

What is claimed is:

1. A system for controlling an air supply system of a train, comprising:
    a locomotive control system programmed to determine the location of a locomotive consist having a first locomotive and at least one trailing locomotive, wherein each locomotive in the consist has an air compressor and a main reservoir system;
    an air supply controller interconnected to the air compressor of each locomotive in the consist, wherein the controller is programmed command each compressor to operate until a predetermined pressure in the air supply system is achieved if the locomotive consist is approaching a tunnel.

2. The system of claim 1, further comprising an air dryer interconnected to the air supply controller, wherein the controller is further programmed to command each air dryer to perform a regeneration cycle if the locomotive consist is approaching a tunnel.

3. The system of claim 2, wherein the air supply controller is further programmed to allow the compressor of the first locomotive to operate and to inhibit the compressors of all trailing locomotives from operating while the locomotive consist is in a tunnel.

4. The system of claim 1, wherein the air supply controller is further programmed to sequentially operate the compressor of each trailing locomotive if the air supply system has a pressure below a predetermined threshold while the locomotive consist is in a tunnel.

5. The system of claim 4, wherein the air supply controller is further programmed to reset the compressors in the consist for normal operation after the locomotive consist has exited a tunnel.

6. The system of claim 1, wherein the air supply controller is further programmed to reset the first compressor to operate when the air supply system has a pressure below a predetermined threshold that is above a pressure that will cause the compressor of each trailing locomotive to operate while the locomotive consist is in a tunnel.

7. The system of claim 6, wherein the air supply controller is further programmed to allow the compressor of each trailing locomotive to operate if air supply system has a pressure that is below the pressure that will cause the compressor of each trailing locomotive to operate while the locomotive consist is in a tunnel.

8. The system of claim 7, wherein the air supply controller is further programmed to reset the compressors in the consist for normal operation after the locomotive consist has exited a tunnel.

9. A method of controlling the air supply system of a train, comprising the steps of:
 determining the location of a locomotive consist having a first locomotive and at least one trailing locomotive, wherein each locomotive in the consist has an air compressor and a main reservoir system with an air dryer; and
 commanding each compressor to operate until a predetermined pressure in the air supply system is achieved if the locomotive consist is approaching a tunnel.

10. The method of claim 9, further comprising the step of commanding each air dryer to perform a regeneration cycle if the locomotive consist is approaching a tunnel.

11. The method of claim 10, further comprising the step of allowing the compressor of the first locomotive to operate and inhibiting the compressors of all trailing locomotives from operating while the locomotive consist is in a tunnel.

12. The method of claim 11, further comprising the step of sequentially operating the compressor of each trailing locomotive if the air supply system has a pressure below a predetermined threshold while the locomotive consist is in a tunnel.

13. The method of claim 9, further comprising the step of resetting the first compressor to operate when the air supply system has a pressure below a predetermined threshold that is above a pressure that will cause the compressor of each trailing locomotive to operate while the locomotive consist is in a tunnel.

14. The method of claim 13, further comprising the step of allowing the compressor of each trailing locomotive to operate if air supply system has a pressure that is below the pressure that will cause the compressor of each trailing locomotive to operate while the locomotive consist is in a tunnel.

* * * * *